(12) United States Patent
Mowry et al.

(10) Patent No.: US 7,756,832 B1
(45) Date of Patent: Jul. 13, 2010

(54) APPARATUS AND METHOD FOR PROVIDING UPGRADE COMPATIBILITY

(75) Inventors: Robert Mowry, Cranberry Township, PA (US); Jacob Gladish, Blue Bell, PA (US); Michael Comer, Pittsburgh, PA (US)

(73) Assignee: NetApp, Inc., Sunnyvale, CA (US)

( * ) Notice: Subject to any disclaimer, the term of this patent is extended or adjusted under 35 U.S.C. 154(b) by 295 days.

(21) Appl. No.: 11/903,528

(22) Filed: Sep. 21, 2007

(51) Int. Cl.
*G06F 7/00* (2006.01)
*G06F 17/00* (2006.01)
(52) U.S. Cl. .......... 707/638; 707/640; 711/161
(58) Field of Classification Search ....... 707/1–10, 707/100–104.1, 200–206, 600–831; 715/229; 717/122, 170, 168–173; 719/328, 330; 711/161–162
See application file for complete search history.

(56) References Cited

U.S. PATENT DOCUMENTS

| 5,915,112 | A | * | 6/1999 | Boutcher ............... 719/330 |
| 2004/0030668 | A1 | | 2/2004 | Pawlowski et al. |
| 2005/0246382 | A1 | | 11/2005 | Edwards |
| 2005/0278382 | A1 | | 12/2005 | LaRocca et al. |
| 2005/0278383 | A1 | | 12/2005 | Kazar et al. |
| 2006/0215700 | A1 | | 9/2006 | Zayas |
| 2006/0248273 | A1 | | 11/2006 | Jernigan, IV et al. |
| 2008/0243947 | A1 | * | 10/2008 | Kaneda ............... 707/203 |

OTHER PUBLICATIONS

Sreenivas et al., Independent global snapshots in large distributed systems, 1997, IEEE, 462-467.*
Peng et al., A case for network-centric buffer cache organization, 2003, IEEE, 1-6.*
Full Disclosure—The Response [webpages] [online]. Retrieved on Sep. 19, 2007. Retrieved from the internet: http://drunkendata.com/?p=622. Total pp. 17.

* cited by examiner

*Primary Examiner*—Jean B Fleurantin
(74) *Attorney, Agent, or Firm*—Perkins Coie LLP

(57) ABSTRACT

An embodiment of the invention provides an apparatus and method that use auto support data for upgrade compatibility. The method includes capturing the input commands that are used by a user (customer) of a storage appliance and that are processed by a current storage operating system in the storage appliance. These input commands are then stored in a database and are the auto support data that is transmitted from the storage appliance via a network to the database. These input commands can be recorded or categorized in the database, based upon the command name or command line arguments of the input commands. These input commands can then be mapped to new input commands that are used with an upgraded storage operating system in a storage appliance. These mapping can be implemented in, for example, a data structure that maps previous input commands to new input commands.

16 Claims, 5 Drawing Sheets

APPARATUS AND METHOD FOR PROVIDING UPGRADE COMPATIBILITY

TECHNICAL FIELD

Embodiments of the invention relate generally to an apparatus and method for providing upgrade compatibility.

BACKGROUND

In storage technology, a storage appliance is one type of computer that provides services relating to the organization and storage of information or data on storage devices such as, for example, disk drives ("disks"). In other words, a storage appliance is adapted to store and retrieve data on behalf of one or more client processing systems ("clients" or "hosts") in response to external requests received from the hosts. A storage appliance can provide clients with file-level access to data stored in the storage devices. A storage appliance can also provide clients with block-level access to stored data, or with both file-level access and block-level access. For convenience, a storage appliance will be described herein, for the most part, in terms of the former, though the description herein will have application to the latter types of storage appliances as well, as will be apparent to those of ordinary skill in the art in light of the description that follows. Examples of such storage appliances include, but are not limited to, a file server or another type of computing device that provides storage services using a file system to respond to file-oriented data access requests ("filer"). A storage appliance includes a storage operating system that implements the file system to logically organize the information as a hierarchical structure of directories and files on the disks. Each file on a disk may be implemented as a set of data structures, e.g., disk blocks, which are configured to store information. A directory may be implemented as a formatted file in which information by other files and directories is stored.

An implemented disk storage for a storage appliance typically has one or more storage "volumes" which are a collection of physical storage disks and which define an overall logical arrangement of storage space. In other words, a storage volume is a logical container that includes a collection of disks. Therefore, the collection of disks are grouped (assimilated) into the storage volume. Each storage volume is generally associated with a file system.

One or more host computers (hosts) can share the storage resources (e.g., storage space) of storage appliances in a network. The process of allocating the storage space to a host is known as "storage provisioning". The host can access and use the storage space that has been allocated to the host. The same storage space can be allocated to different hosts, and as a result, the different hosts can use the same storage space. Different storage space can also be allocated to different hosts, so that each host is allocated with a unique storage space. A user of a storage appliance can input commands into an interface of the storage appliance, in order to control or manage the storage appliance. A particular storage operating system in the storage appliance can respond to the input commands. However, if the storage operating system is upgraded, the input commands to the upgraded storage operating system may change in command name and/or command line arguments in the input command. As a result, when a user (e.g., customer) upgrades their storage operating system from a current version to a newer version, the command name and/or command line arguments for the newer version may be different from the command name and/or command line arguments for the current version. Therefore, there is added burden for the user who has to learn these new changes in the input commands. An example of upgrading a storage operating system in a computing device is when a Data Ontap® 7 G operating system is replaced with (upgrade to) the Data Ontap® GX storage operating system, as discussed below in additional details, although this example is not intended to limit the scopes of embodiments of the invention. It would be advantageous to ease the burden on a user, when changes occur in the input commands due to the upgrade of the storage operating system.

SUMMARY OF EMBODIMENTS OF THE INVENTION

An embodiment of the invention provides an apparatus and method that use auto support data for upgrade compatibility. The method includes capturing the input commands that are used by a user (customer) of a storage appliance and that are processed by a current storage operating system in the storage appliance. These input commands are then stored in a database and are the auto support data that is transmitted from the storage appliance via a network to the database. These input commands can be recorded or categorized in the database, based upon the command name or command line arguments of the input commands. By recording or categorizing the input commands, the frequently used input commands (i.e., commands that were frequently used by the user of the storage appliance) are determined. If the frequency of the input command exceeds a threshold frequency, then a translation of the input command is provided, wherein the translation is compatible with a second storage operating system that is an upgrade of the first storage operating system. Therefore, the translation eases a migration of a user to the upgrade of the current storage operating system. As an example and without intending to limit the embodiments of the invention, the frequently used input commands can then be mapped to new input commands that are used with an upgraded storage operating system in a storage appliance. These mapping can be implemented in, for example, a data structure that maps previous input commands to new input commands. As a result, when a customer of a storage appliance upgrades (migrates) from a current storage operating system to an upgraded storage operating system, the burden of migration to the upgraded storage operating system is decreased for the customer, because the customer will be able to continue to use the previous input commands that are used for the current storage operating system and these previous input commands are then mapped to the new input commands that are used with an upgraded storage operating system. Therefore, an embodiment of the invention decreases the barrier for customers who will migrate to upgraded storage operating systems.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

Figure 1:
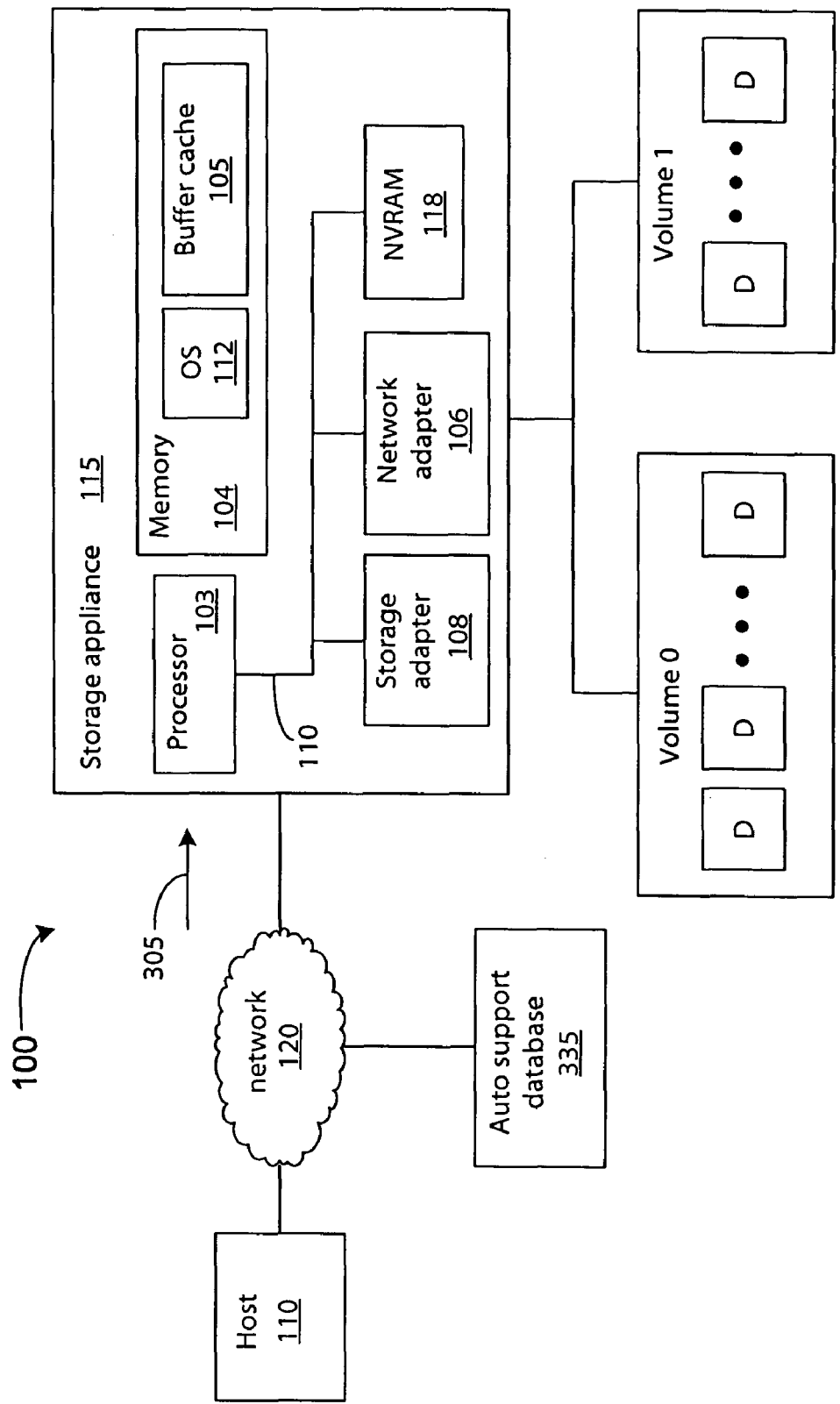
FIG. 1 is a block diagram of a system (apparatus), in accordance with an embodiment of the invention.

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

When a customer upgrades the software in a storage appliance (or other computing device that provides services relating to the organization and storage of information or data on storage devices such as, for example, disk drives ("disks")), the customer will likely encounter command line compatibility issues because a command name and/or command line arguments can differ in the current software version and the upgraded software version. For example, as similarly discussed in the above background section and without intending to limit various embodiments of the invention, when a customer upgrades the storage operating system in a storage appliance from the Data Ontap 7G software to the Data Ontap GX software, commands issued by the customer can change in the command names and/or command line arguments due to various software changes in the upgrades such as, for example, the use of the D-blades and N-blades in the Data Ontap GX storage OS. These changes in the command names and/or command line arguments serve as a potential barrier to customers who upgrade their software. An embodiment of the invention provides an apparatus and method that use auto support data for upgrade compatibility, in order to ease the migration of customers to the upgraded software. In an embodiment of the invention, the input commands that are used by a user (customer) of a storage appliance and that are processed by a current storage operating system in the storage appliance, are recorded (stored) in a database. These input commands can be recorded or categorized in the database, based upon the command name or command line arguments of the input commands. By recording or categorizing the input commands, the frequently used input commands (i.e., commands that were frequently used by the user of the storage appliance) are determined. These frequently used input commands can then be mapped to new input commands that are used with an upgraded storage operating system in a storage appliance. As a result, when a customer of a storage appliance upgrades (migrates) from a current storage operating system to an upgraded storage operating system, the burden of migration to the upgraded storage operating system is decreased for the customer, because the customer will be able to continue to use the previous input commands that are used for the current storage operating system and these previous input commands are then mapped to the new input commands that are used with an upgraded storage operating system. Therefore, an embodiment of the invention decreases the barrier for customers who will migrate to upgraded storage operating systems.

FIG. 1 is a block diagram of a system (apparatus) 100, in accordance with an embodiment of the invention. The system 100 includes one or more host devices 110, and one or more storage appliances 115. For purposes of clarity, only one host device 110 and one storage appliance 115 are shown in the example of FIG. 1. The host device 110 and storage appliance 115 can communicate via a network 120 which may be, for example, a local area network (LAN), a wide area network (WAN), virtual private network (VPN), a combination of LAN, WAN and VPM implementations, or another suitable communication network. In another embodiment of the invention, all elements or components that are associated with each of the devices 110 and 115 are implemented in a single device such as, for example, the host device 110. In this alternative implementation, the host device 110 is implemented as a stand-alone computer.

Each of the devices in the system 100 typically includes an appropriate conventional network interface arrangement (not shown) for communicating over the network 102 using a desired communication protocol such as, for example, Transport Control Protocol/Internet Protocol (TCP/IP), User Datagram Protocol (UDP), Hypertext Transfer Protocol (HTTP), Simple Network Management Protocol (SNMP), or other suitable protocols.

A storage appliance is a computer that provides file service relating to the organization or storage of information on storage devices, such as disks. Examples of currently available storage appliance products and associated software components are commercially available from, for example, NETWORK APPLIANCE, INC., Sunnyvale, Calif. or other vendors. Additional details of an example storage appliance are also disclosed in, for example, commonly-assigned U.S. patent application Ser. No. 10/215,917. In addition, it will be understood to those skilled in the art that the embodiments of the invention described herein may also apply to any type of special-purpose computer (e.g., server) or general-purpose computer, including a stand-alone computer, embodied as a storage appliance or file server. Moreover, the teachings of the embodiments of the invention can also be adapted to a variety of file server architectures including, but not limited to, a network-attached storage environment, or a storage area network and disk assembly directly-attached to a client/host computer. The term "storage appliance" or "file server" or "filer" should therefore be taken broadly to include such arrangements.

The storage appliance 115 includes a processor 103, a memory 104, a network adapter 106, and a storage adapter 108 interconnected by a system bus 110. The storage appliance 115 also includes a storage operating system 112 that implements a file system to logically organize the information as a hierarchical structure of directories and files on a disk. Additionally, a persistent storage device 118 such as, for example, a non-volatile RAM (NVRAM) 118 is also typically connected to the system bus 110. Although NVRAMs are shown in FIG. 1, any suitable persistent storage device that retains content in the event of a power failure or other system failure can be used in place of the NVRAMs. An example of a suitable persistent storage device is a battery-backed RAM, although other suitable storage devices may also be used.

In an illustrative embodiment, the memory 104 may have storage locations that are addressable by the processor 103 for storing software program code or data structures for use in the functions of the storage appliance 115. The processor 103 and adapters 106 and 108 may, in turn, include processing elements and/or logic circuitry configured to execute the software code and manipulate the data structures.

The storage operating system 112, portions of which are typically resident in memory 104 and executed by the processing elements, functionally organizes a storage appliance by inter-alia invoking storage operations in support of the file services that are implemented by the storage appliance. It will be apparent by those skilled in the art that other processing and memory implementations, including various computer readable media may be used for storing and executing program instructions pertaining to the inventive techniques described herein.

The network adapter 106 includes the mechanical, electrical, and signaling circuitry for connecting the storage appliance 115 to a host 110 over the computer network 120 or connecting the storage appliance 115 to other storage appliance(s). A host 110 can be a general-purpose computer configured to execute applications including file system protocols such as, for example, the Network File System (NFS) or the Common Internet File System (CIFS) protocol or other suitable protocols. Moreover, the host 110 can interact with the storage appliance 115 in accordance with the known client/server model of information delivery.

The storage adapter 108 cooperates with the storage operating system 112 in order to access information requested by the host 110. Each storage volume is constructed from an array of storage devices D (e.g., physical disks D) that are typically organized as RAID disk groups. The RAID disk groups include independent physical disks including those storing a striped data and those storing separate parity data. The number of storage devices (e.g., disks) in a storage volume and in a RAID disk group may vary.

The storage adapter 108 includes input/output interface circuitry that couples to the storage devices over an I/O interconnect arrangement such as, for example, a conventional high-speed/high-performance fibre channel serial link topology. The information is retrieved by the storage adapter 108, and may be processed by the processor 103 (or the adapter 108 itself) prior to being forwarded over the system bus 110 to the network adapter 106, where the information is formatted into a packet and returned to the host 110.

To facilitate access to the storage devices (e.g., disks), the storage operating system 112 typically implements a file system that logically organizes the information as a hierarchical structure of directories in files on the storage devices. Each file on a storage device may be implemented as a set of data blocks configured to store information such as text or other format. The directory may be implemented as a formatted file in which other files and directories are stored. The storage operating system 112 associated with each volume is, for example, the Data ONTAP® storage operating system which is commercially available from NETWORK APPLIANCE, INC. Additional details of an example storage operating system 112 are disclosed in, for example, commonly-assigned U.S. patent application Ser. No. 10/836,090. The Data ONTAP storage operating system implements a Write Anywhere File Layout (WAFL)® file system. However, it is expressly contemplated that the principles of embodiments of this invention can be implemented using a variety of alternate storage operating system architectures.

As discussed below, an input command forwarding software thread 330 (FIG. 3) in the storage appliance 115 forwards an input command 305 to an auto support database 335 via network 120. The input command 305 may be received by the storage appliance 115 from a host 110 or may be directly input into the storage appliance 115 by a user. The database 335 may be included in the host 110, in the storage appliance 115, or as a separate device that can be coupled to the network 120. The database 335 may be any suitable database such as, for example, an Oracle database or other suitable types of database products. Additional details on the database 335 are discussed below.

Figure 2:
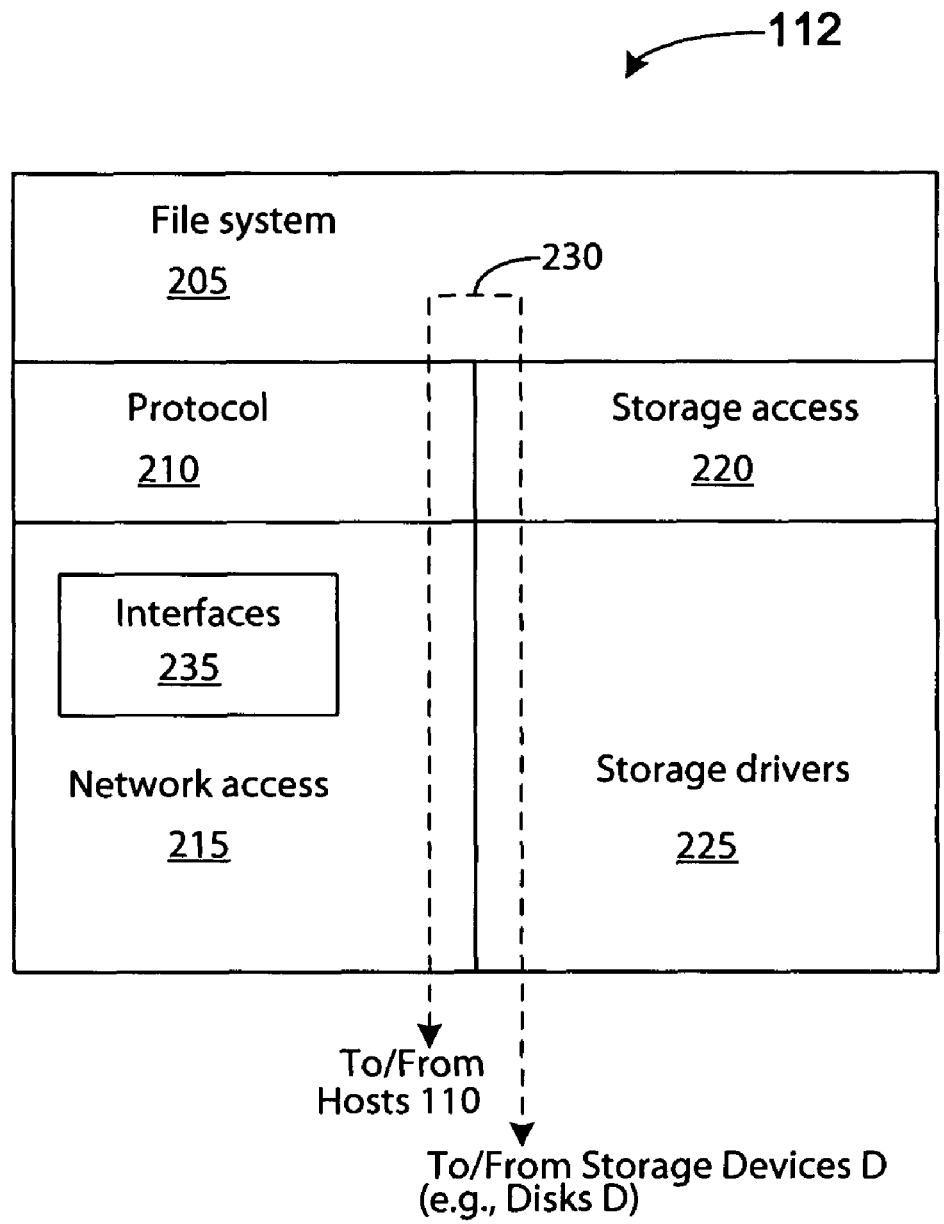
FIG. 2 is a block diagram of an example storage operating system that can be used in an embodiment of the invention.

FIG. 2 is a schematic block diagram of an example storage operating system 112 that may be advantageously used in an embodiment of the invention. As shown, a storage operating system 112 includes several modules, or "layers". These layers include a file system 205. The file system 205 is application-layer software that keeps track of the directory structure (hierarchy) of the data stored in a storage subsystem and manages read/write operations on the data (i.e., executes read/write operations on the disks in response to client requests). The operating system 112 also includes a protocol layer 210 and an associated network access layer 215, to allow a storage appliance to communicate to devices in a network, such as the host 110. The protocol 210 layer implements one or more of various higher-level network protocols, such as, for example, Network File System (NFS), Common Internet File System (CIFS), Hypertext Transfer Protocol (HTTP) and/or Transmission Control Protocol/Internet Protocol (TCP/IP), which are network protocols that are known to those skilled in the art. The network access layer 215 includes one or more drivers that implement one or more lower-level protocols to communicate over the network, such as Ethernet. The network access layer 215 may incorporate one or more interfaces 235 that receive input commands from a user.

The storage operating system 112 also includes a storage access layer 220 and an associated storage driver layer 225, to allow a storage appliance to communicate with a storage subsystem. The storage access layer 220 implements a higher-level disk storage protocol, such as RAID, while the storage driver layer 225 implements a lower-level storage device access protocol, such as Fibre Channel Protocol (FCP) or SCSI, which are protocols that are known to those skilled in the art. Also shown in FIG. 2 is path 230 which represents the data flow through the storage operating system 112 associated with a read or write operation. Additional details of an example storage operating system 112 are described in the above-mentioned commonly-assigned U.S. patent application Ser. No. 10/836,090.

As used herein, the term "storage operating system" generally refers to the computer-executable code operable to perform a storage function in a storage appliance, e.g., that manages data access and may, in the case of a file server, implement file system semantics. In this sense, the Data ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., file server, filer or multi-protocol storage appliance) or general-purpose computer, including a standalone computer or portion thereof, embodied as or including a storage appliance 115. An example of a multi-protocol storage appliance that may be advantageously used with the present invention is described in commonly-assigned U.S. patent application Ser. No. 10/215,917. Moreover, the teachings of this invention can be adapted to a variety of storage appliance architectures or storage system architectures including, but not limited to, a network-attached storage environment, a storage area network and disk assembly directly-attached to a client or host computer. The term "storage appliance" should therefore be taken broadly to include such arrangements in addition to any subsystems configured to perform a storage function and associated with other equipment or systems.

For purposes of further understanding of an embodiment of the invention, an example is first discussed of an upgrade in a storage operating system, and this example is not intended to limit the scopes of embodiments of the invention. The Data Ontap 7G® storage operating system, which is commercially available from Network Appliance, Incorporated, automatically expands and shrinks volumes to accommodate real-time changes in storage demands. This storage OS provides various features such as a virtualization layer between storage devices and volumes, so that a volume is no longer tied to specific storage devices, regardless of the size of a data set in the volume. As a result, the storage capacity that is allocated to that data set can expand or shrink dynamically, and this feature leads to ease in storage management and scalability.

A storage appliance, for example, can have its storage operating system upgraded from the Data Ontap 7G storage OS to the Data Ontap GX® storage OS (or other software upgrades in storage OS technology that becomes available). The Data Ontap GX storage OS provides GX clusters (nodes), with each GX cluster being formed by an N-blade and a D-blade. Further details on the N-blades and D-blades are disclosed in, for example, commonly assigned U.S. patent application Ser. Nos. 11/118,681, 10/856,448, and 10/856,469. The N-blades and D-blades are typically separately-scheduled processes of a storage OS or pieces of code within a single OS process. An N-blade includes functionalities that permit the GX cluster to connect to clients and a D-blade connects to storage devices (e.g., disks of a disk array). An N-blade functions as a storage protocol handler for client connections and translates file-based data access requests and block-based data access request from clients into file system primitive operations (commands) that are transmitted to the D-blades. A D-blade functions as a storage server for data organization and storage, and services one or more volumes of a disk array. The N-blades and D-blades permit individual files or datasets to be striped across multiple disk arrays. If the requested data is local to a disk array (or disk) associated with a GX cluster that receives the request, that GX cluster serves the file. If the data is not local, the GX cluster routes the request over the private switched cluster network to a GX cluster associated with a disk array (or disk) where the data resides. That GX cluster then forwards the requested data back to the requesting GX cluster with the requested data to be forwarded to the client. A switch fabric that connects the GX clusters will permit an N-blade in one GX cluster to communicate with a D-blade in a different GX cluster. Due to the D-blades and N-blades in the Data Ontap GX storage OS and due to the different data structures that are used in the different OS types, various input commands that are issued by a customer into the Data Ontap GX storage OS and into Data Ontap 7G will differ.

Figure 3:
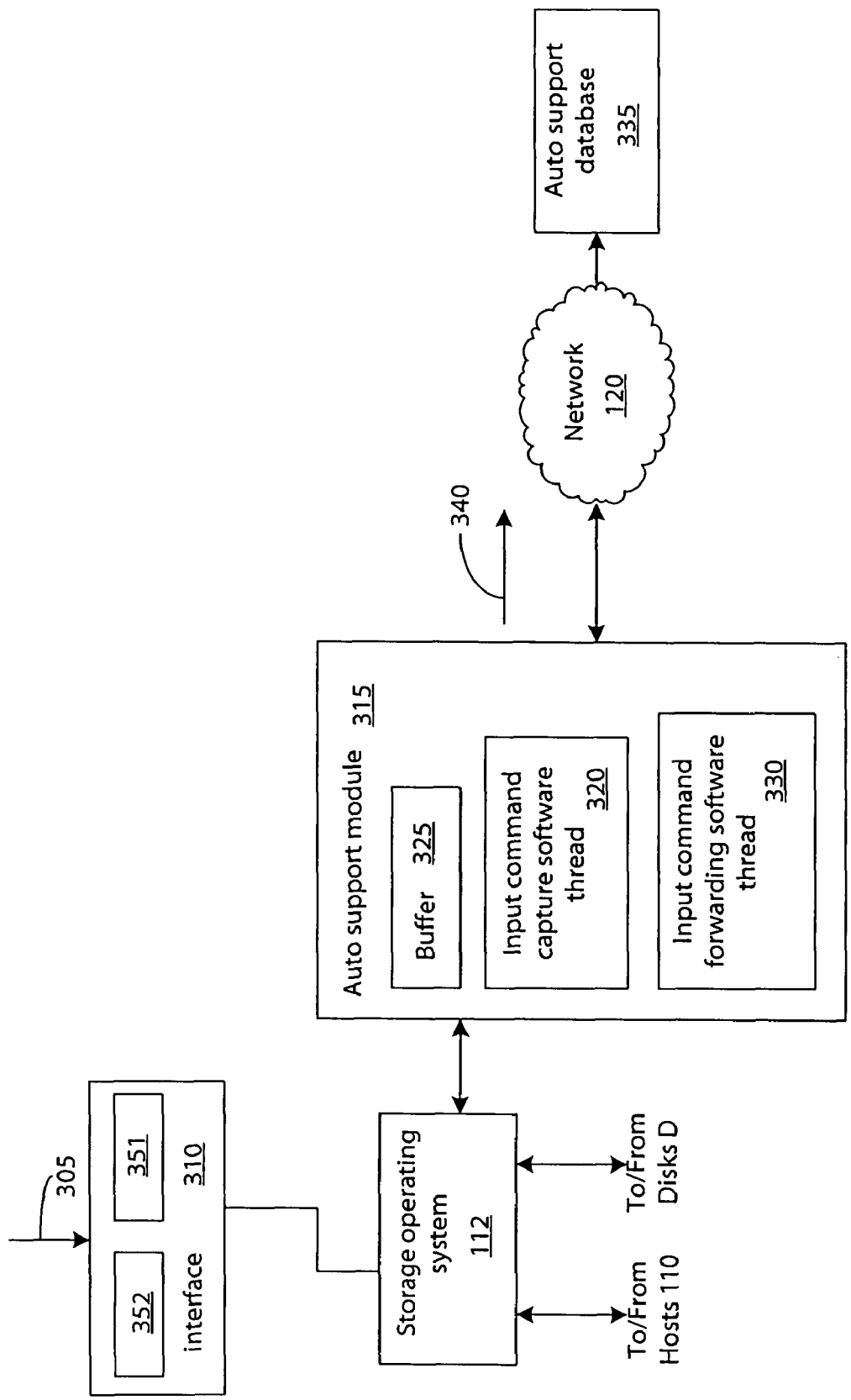
FIG. 3 is a block diagram that illustrates additional details of an embodiment of the invention.

FIG. 3 is a block diagram that illustrates additional details of an embodiment of the invention. A user can provide an input command (input data) 305 into a storage appliance 115 via an interface 310. The input command 305 is used, for example, to permit the user to control or manage the storage appliance. Examples of the interface 310 include, but are not limited to, a command line interface (CLI) or the zephyr API (ZAPI) which is an application interface that is provided by Network Appliance Incorporated.

The storage operating system 112 processes the input commands 305 in order to permit operations based upon the input commands 305. Additionally, an auto support module 315 performs various operations on the input commands 305 as discussed below. Typically, a user can enable or disable the operations of the auto support module 315. One example of the auto support module is the Data ONTAP 7G auto support module which is commercially available from Network Appliance, Inc. However, other types of auto support modules 315 may be used as well in the example system of FIG. 3.

The auto support module 315 typically includes an input command capture software thread 320 which copies the input commands 305, including syntax, command line arguments, and/or other parameters of the input commands 305. The copy of the input commands 305 are buffered in the buffer 325. An input command forwarding software thread 330 then forwards the buffered input command 305 (in buffer 325) to an auto support database 335 via network 120. The database 335 may be any suitable database such as, for example, an Oracle database or another suitable type of database product. Therefore, the auto support module 315 will forward (to the database 335) a copy 340 of each input command 305 that is received by the interface 310. Typically, the copies 340 are transmitted by the auto support module 315 to the database 335 in a periodic time interval. A statistic can be maintained in the database 335 on the frequency of use of input commands 305 that are used in storage appliances 115 that are connected to the network 120, as discussed below.

Figure 4:
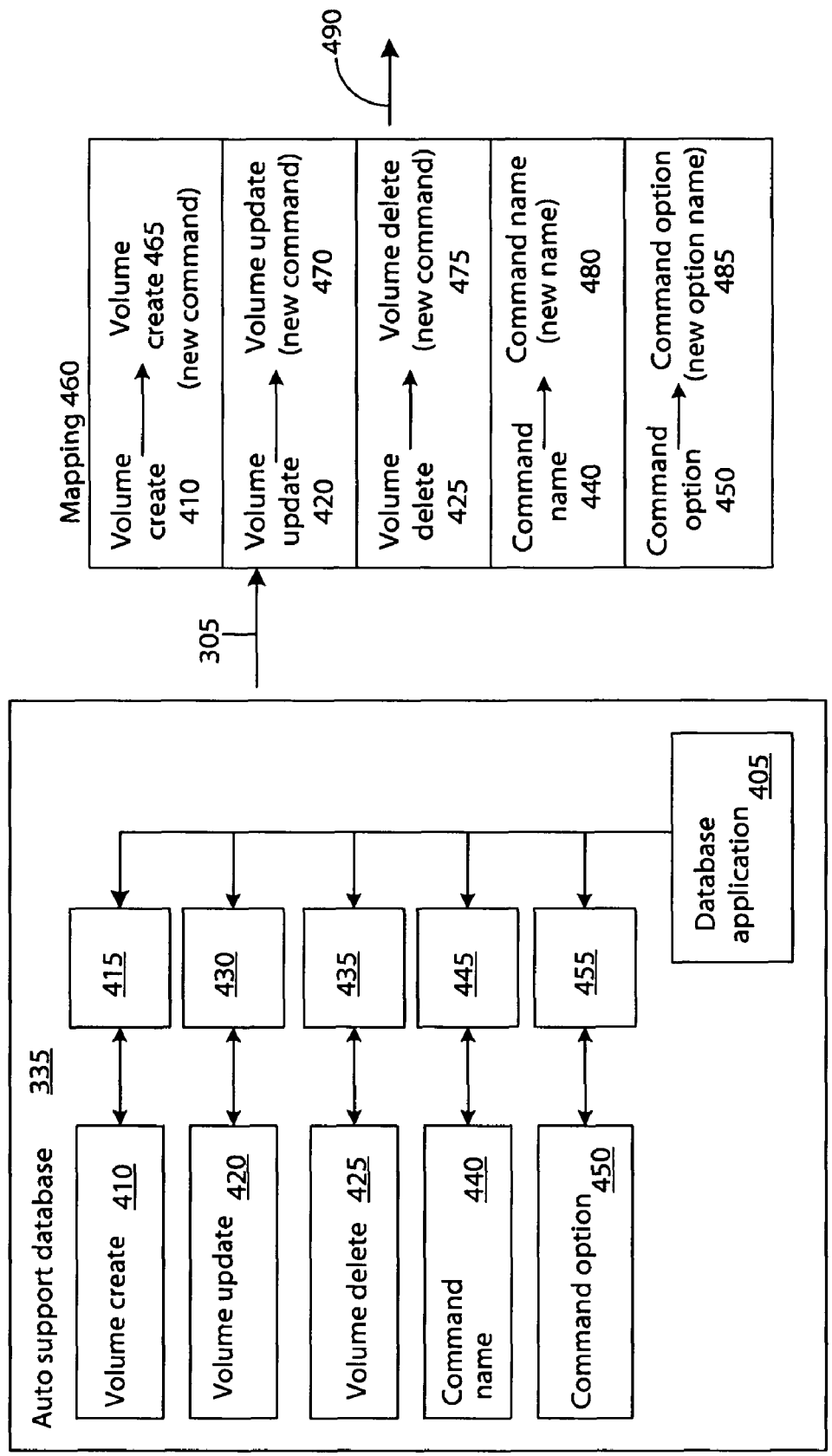
FIG. 4 is a block diagram that illustrates additional details of an embodiment of the invention.

In FIG. 4, a database application 405 can record the number of command types or command names that are received by the auto support database 335. The functions described below for the database application 405 are performed by standard commercially available database applications. Various example command types or command names are recorded by the database application 405. For example, a command type, "volume create" 410 is used as an input command 305 by a user to create a data volume (e.g., Volume 0 in FIG. 1). If the command type, volume create 410, has been used by users in all storage appliances 115 (connected to the network 120) at 500 times at the present time, then a counter value 415 for volume create 410 will be at the value of 500. This value of 500 indicates a frequency of use (frequency or occurrence) for the command type, volume create 410.

Alternatively, the database application 405 can list the input commands by command name or by command line arguments. Commercially available database applications provide this listing feature.

Other command types may also be recorded in frequency of use. For example, the frequency of uses for the command types, volume update 420 and volume delete 425, are recorded by the counter values 430 and 435, respectively.

Input command names may also be recorded in frequency of use. For example, to create a storage volume, a command name 440 would have the following format that is processed by one version of a storage operating system (e.g., Data ONTAP 7G):

"node>volume create"

The frequency of use of the command name 440 is recorded by the counter value 445. This command name 440 is also stored as a value in the data structure of mapping 460.

The mapping 460 translates this command name to the following new command name in an upgraded storage operating system version (e.g., Data ONTAP GX):

node::>volume new -vserver vs1 -volume dept_name

This new command name 480 is also stored as a value in the data structure of mapping 460.

Options in input commands may also be recorded in frequency of use. For example, a command option 445 is recorded in frequency of use by the counter value 455. An example option in an input command is shown below and is used in the Data ONTAP 7G storage operating system:

vol create trad_vol_1 -t raid_dp

The parameter "-t" is a command option to the "vol create" command and these option controls the type of RAID that will be used when creating the volume. Example values for this parameter include: raid4, raid_dp and raid0, which corresponds to RAID types. An upgraded storage operating system may change the format of the above input command with the command option parameter.

For purposes of showing the differences in input commands when a storage operating system is upgraded, a listing is shown below on other example commands that are used in Data ONTAP 7G and the corresponding commands that are used in Data ONTAP GX.

To add three new disks in an aggregate, the commands in Data ONTAP 7G is as follows:

"aggr add aggr1 -g rg0 3"

To add three new disks in an aggregate, the commands in Data ONTAP GX is as follows:

"storage aggregate add -aggregate aggr1 -raidgroup rg0 -diskcount 3"

To create a Snapshot, the commands in Data ONTAP 7G is as follows:

"snap create vol1 snap1"

To create a Snapshot, the commands in Data ONTAP GX is as follows:

"volume snapshot create -vserver vs0 -volume vol1 -snapshot snap1"

To initialize a Snapmirror (which is a feature in the SnapMirror software products from Network Appliance, Inc.), the commands in Data ONTAP 7G is as follows:

"snapmirror initialize -S vol1 -w filerB"

To initialize a Snapmirror, the commands in Data ONTAP GX is as follows:

"volume mirror new -vserver vs0 -volume vol1 -mirror vol1_mirror -replicate-now true"

To assign an ownership to a storage appliance (e.g., filer A) for a Disk, the commands in Data ONTAP 7G is as follows:

"disk assign 0a.17 -o filerA"

To assign an ownership to a storage appliance (e.g., filer A) for a Disk, the commands in Data ONTAP GX is as follows:

"storage disk modify -disk filerA::0a.17 -owner filerA"

To obtain status of a disk failure, the commands in Data ONTAP 7G is as follows:

"disk fail 0a.17"

To obtain status of a disk failure, the commands in Data ONTAP 7G is as follows:

"storage disk setstate -disk localfiler::0a.17 -action fail"

Other types of command names and command types are used in the Data ONTAP 7G and Data ONTAP GX storage operating systems.

In an embodiment of the invention, the frequently used command types (e.g., types 410-425), command names (e.g., name 440), and command options (e.g., command option 455) are mapped to command types, command names, and command options for an upgraded storage operating system. As an example, the command types (e.g., types 410-425), command names (e.g., name 440), and command options (e.g., command option 455) are used in the Data ONTAP 7G storage operating system, while the upgrade storage operating system is the Data ONTAP GX storage operating system.

However, the method of an embodiment of the invention can be used for other types of storage operating systems as well or other types of software upgrades. The command types, command names, and command options for the upgraded storage operating system may have syntax or other formats that differs from the syntax or other formats of the frequently used command types (e.g., types 410-425), command names (e.g., name 440), and command options (e.g., command option 455). In another embodiment of the invention, each command type, command name, and command option that are stored in the database 335 are mapped are mapped to command types, command names, and command options for the upgraded storage operating system.

A mapping 460 can be implemented by use of, for example, a table data structure. The mapping 460 provides a translation of the input data 305 into a new translation 490. For example, the volume create 410 command type is mapped by the mapping 460 to a new command type, volume create (new command) 465, which is an input command that is processed by the upgraded operating system. Similarly, the command types 420-425, command name 440, and command option 450 are mapped to the new command types 470-475, new command name 480, and new command option name 485, respectively. The mapping between the command types and new command types are manually perform by setting the data structure values in the mapping 460. This mapping involves manually cross-referencing the old commands 305 with the new commands 490, as indicated for, example, in the user manuals of the storage operating system versions. Standard programming languages (e.g., C or C++) and standard programming techniques can then be used to set the data structure values in the mapping 460, so that the old commands 305 are mapped to appropriate new commands 490.

The mapping 460 translates the input commands 305 (used in the storage operating system 112) into new input commands that are compatible with the upgraded storage operating system. An interface (e.g., interface 310) will include the mapping 460 and performs the translation of the input commands 305 into the new input commands 490 that are compatible with the upgraded operating system. Various known methods can be used for translating a command from one format to another format. For example, a parsing software thread 351 (FIG. 3) in the interface 310 can parse the input command 305 in order to read the values in the input command 305. A command translator software thread 352 can then perform a table lookup in the mapping 460 for the values in the input command 305 and translate the values in the input command 305 into the new values found in the mapping 460. Specific steps in the parsing of commands and translations of commands are well known to those skilled in the art. Therefore, the interface 310 can obtain the parameters for the new command from values in the mapping table 460 in order to translate the old command 305 into the new command 490. The upgraded storage operating system can then process the compatible new command 490.

The mapping 460 eases the use of the upgraded storage operating system for users, because users can continue to use the same input commands 305 that are used in a previous storage operating system. Therefore, the mapping 460 eases the migration of users from storage operating system to an upgrade storage operating system.

Figure 5:
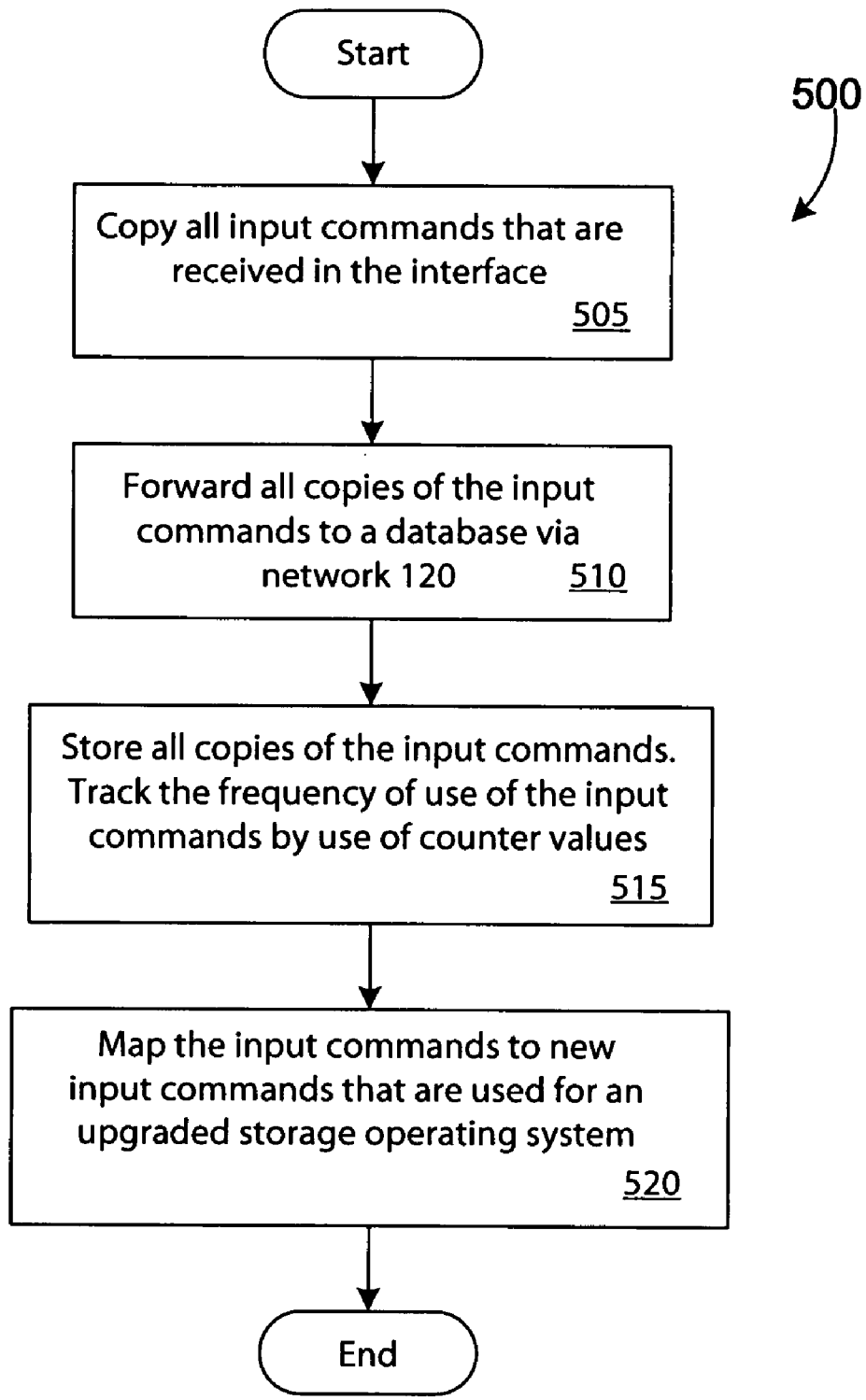
FIG. 5 is a flow diagram that illustrates a method in accordance with an embodiment of the invention.

FIG. 5 is a flow diagram of a method 500 in accordance with an embodiment of the invention. In block 505, the auto support module 315 copies all input commands 305 that are received in the interface 310.

In block 510, the auto support module 315 forwards the copies of the input commands 305 to the database 335 via the network 120.

In block 515, the database 335 stores all copies of the input commands. The database 335 records the frequency of use of the input commands by use of counter values that corresponds to each input command.

In block 520, a user can set a mapping 460 of the input commands 305 to new input commands 490 that are used in an upgraded storage operating system. The interface 310 can use this mapping 460 to translate the input commands 305 into the new input commands 490.

It is also within the scope of an embodiment of the present invention to implement a program or code that can be stored in a machine-readable medium to permit a computer to perform any of the methods described above.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for providing upgrade compatibility when a storage operating system is upgraded in a storage appliance, the method comprising:
   receiving an input command in an interface of a storage appliance, wherein the input command is compatible with a first storage operating system of the storage appliance;
   transmitting from the storage appliance the input command via a network to a database;
   recording a frequency of the input command in the database;
   determining if the frequency of the input command exceeds a threshold frequency; and
   if the frequency of the input command exceeds a threshold frequency, then translating the input command to a form compatible with a second storage operating system in the storage appliance, wherein the second storage operating system is an upgrade of the first storage operating system.

2. The method of claim 1 wherein the translating includes utilizing a mapping.

3. The method of claim 1, further comprising recording in a mapping in the storage appliance each input command in the database based on the frequency of the input command.

4. The method of claim 3, wherein the translating includes utilizing the mapping.

5. The method of claim 1, wherein the input command includes a command type.

6. The method of claim 1, wherein the input command includes a command name.

7. The method of claim 1, wherein the input command includes a command option.

8. The method of claim 1, further comprising:
   using, by the interface, a mapping to translate the input command.

9. A storage appliance comprising:
   a processor;
   a memory coupled to the processor;
   an interface configured to receive an input command that is compatible with a first storage operating system of the storage appliance, and configured to transmit the input command via a network to a database configured to record a frequency of the input command;
   wherein the processor is configured to translate the input command to a form compatible with a second storage operating system in the storage appliance that is an upgrade of the first storage operating system if a frequency of the input command exceeds a threshold frequency.

10. The storage appliance of claim 9, wherein the memory is configured to store a mapping of the input command into a translation.

11. The storage appliance of claim 10, wherein the mapping includes a table data structure.

12. The storage appliance of claim 9, wherein the memory is configured to store a mapping of each input command in the database to a corresponding translation.

13. The storage appliance of claim 9, wherein the input command includes a command type.

14. The storage appliance of claim 9, wherein the input command includes a command name.

15. The storage appliance of claim 9, wherein the input command includes a command option.

16. The storage appliance of claim 9, further comprising an auto support module configured for communication with the database.

* * * * *